US005921700A

United States Patent [19]

Haver et al.

[11] Patent Number: 5,921,700

[45] Date of Patent: Jul. 13, 1999

[54] HANDLE TO TOOL HEAD TRANSITION PIECE

[75] Inventors: Stephen Thomas Haver, York, Pa.; Robert Leroy Diekman, Springboro, Ohio

[73] Assignee: True Temper Hardware Company, Camp Hill, Pa.

[21] Appl. No.: 08/788,684

[22] Filed: Jan. 24, 1997

[51] Int. Cl.[6] .......... F16B 7/00

[52] U.S. Cl. .......... 403/371; 403/368; 403/365; 294/57; 172/371; 16/108

[58] Field of Search .......... 403/371, 372, 403/367, 368, 365, 220, 225, 361, 366, 743, 192, 194, 195, 309, 310; 56/400.01, 400.06, 400.04, 400.17, 400.18, DIG. 18; 172/371, 375, 374; 294/57; 15/148, 143.1; 16/110 R, DIG. 24, 108, 109, DIG. 41

[56] References Cited

U.S. PATENT DOCUMENTS

| | | | |
|---|---|---|---|
| 648,461 | 5/1900 | Jacobs . | |
| 1,619,569 | 3/1927 | Dedouch | 16/DIG. 24 X |
| 2,548,052 | 4/1951 | Phaneuf et al. | 403/361 X |
| 2,950,937 | 8/1960 | Bedford, Jr. | 403/361 X |
| 3,173,462 | 3/1965 | Koeppel . | |
| 3,187,363 | 6/1965 | Auwarter | 15/143.1 X |
| 4,433,931 | 2/1984 | Malish et al. | 403/194 |
| 4,697,949 | 10/1987 | Perez | 403/192 X |
| 4,722,634 | 2/1988 | Malish | 403/361 X |
| 4,790,586 | 12/1988 | Stoner, Jr. . | |
| 4,842,009 | 6/1989 | Reback | 403/361 X |
| 4,928,342 | 5/1990 | Friedman et al. | 15/145 |
| 5,056,953 | 10/1991 | Marot et al. | 403/194 |
| 5,203,051 | 4/1993 | Tonami et al. | 403/194 X |
| 5,366,314 | 11/1994 | Young | 403/192 X |
| 5,393,079 | 2/1995 | Wang | 403/371 X |
| 5,415,448 | 5/1995 | Keathley . | |
| 5,603,584 | 2/1997 | Schuele | 403/371 |

FOREIGN PATENT DOCUMENTS

| | | | |
|---|---|---|---|
| 1087246 | 2/1955 | France | 403/371 |
| 1141565 | 3/1957 | France | 15/145 |
| 59276 | 12/1967 | Germany | 15/143.1 |
| 2747541 | 4/1979 | Germany | 403/371 |
| 323 | of 1902 | United Kingdom | 403/365 |
| 178311 | 4/1922 | United Kingdom | 403/365 |

*Primary Examiner*—Harry C. Kim
*Attorney, Agent, or Firm*—Eckert Seamans Cherin & Mellott, LLC

[57] ABSTRACT

A transition piece for use on tools of the type having a tool head with a socket to receive a tool handle. The transition piece includes a hollow cylindrical body and an annular skirt extending from the cylindrical body and encircling the body to define a recess for receiving the end of a tool head socket. A lower portion of the body is provided with slots to define a split end, and such insertion of a tool handle through the transition piece causes the split end to be biased radially outwardly into engagement with the tool head socket. In addition, the transition piece provides a smooth visual transition between the handle and the socket.

5 Claims, 3 Drawing Sheets

28 30 10 20 18 46 5 5 45 40 24 42 26 38 46 45 22 32 34 36

HANDLE TO TOOL HEAD TRANSITION PIECE

BACKGROUND OF THE INVENTION

This invention relates to hand tools such as shovels, rakes, and the like, and more particularly, to a transition piece forming an interface between a tool handle and a tool head.

Hand tools, such as shovels, rakes and similar tools, typically include a tool head having a socket extending from an upper portion of the head for receiving the end of a tool handle. The handle is held in position in the socket by frictional engagement between the handle and socket. The handle is typically formed of wood or fiberglass, and during use the material of the handle may be gradually worked at the upper end of the socket whereby a gap is formed between the handle and socket. Thus, the handle may eventually become loose in the socket.

There is a need for an interface between the handle and socket of a tool to maintain a firm connection between the socket and tool, and to ensure that the handle remains firmly engaged within the socket without deterioration of the handle or the socket leading to weakening of the connection therebetween.

SUMMARY OF THE INVENTION

The present invention provides a transition piece for use on tools of the type comprising a tool head having a socket that is adapted to receive a tool handle. The transition piece comprises a hollow, substantially cylindrical body having an upper end, a lower end, an outer wall surface and an inner wall surface. The cylindrical body is sized so as to receive within its interior a portion of a tool handle, such as the shaft of a shovel. Typically, the tool handle will extend through the interior of the cylindrical body.

The upper end includes an annular skirt that is disposed radially outwardly from the outer wall surface of the cylindrical body. The annular skirt includes an inner surface facing the outer wall surface of the cylindrical body so as to define an annular recess adapted to receive a portion of a tool head socket.

The lower end of the cylindrical body tapers radially inwardly. A plurality of slots, and preferably a pair of diametrically opposed slots, are formed in the cylindrical body extending longitudinally from the lower end toward the upper end. Each of the slots includes an open end adjacent to the lower end of the cylindrical body and a terminal end located intermediate the lower end and the upper end of the body. In this way, the lower end is segmented into a plurality of wall sections. These wall sections taper radially inwardly. A plurality of locking ramps are circumferentially disposed on the inner surface of the tapered walls. Engagement of the tool handle with the locking ramps on the inner surface of the tapered walls operates to bias the outer wall surface of the cylindrical body outwardly toward engagement with the portion of the tool head socket that is positioned in the annular recess. Thus, the transition piece of the invention forms a resilient interface or spacer which displaces shearing forces between the tool head socket and a handle and which also ensures firm engagement between the socket and handle.

Therefore, it is an object of the present invention to provide a transition piece between a tool head socket and a handle for displacing forces between the socket and handle.

It is a further object of the invention to provide such a transition piece wherein a rigid connection is produced to ensure firm engagement between the socket and handle.

Other objects and advantages of the invention will be apparent from the following description of a preferred embodiment, the accompanying drawings and the appended claims.

DETAILED DESCRIPTION OF THE PREFERRED EMBODIMENT

Figure 1:
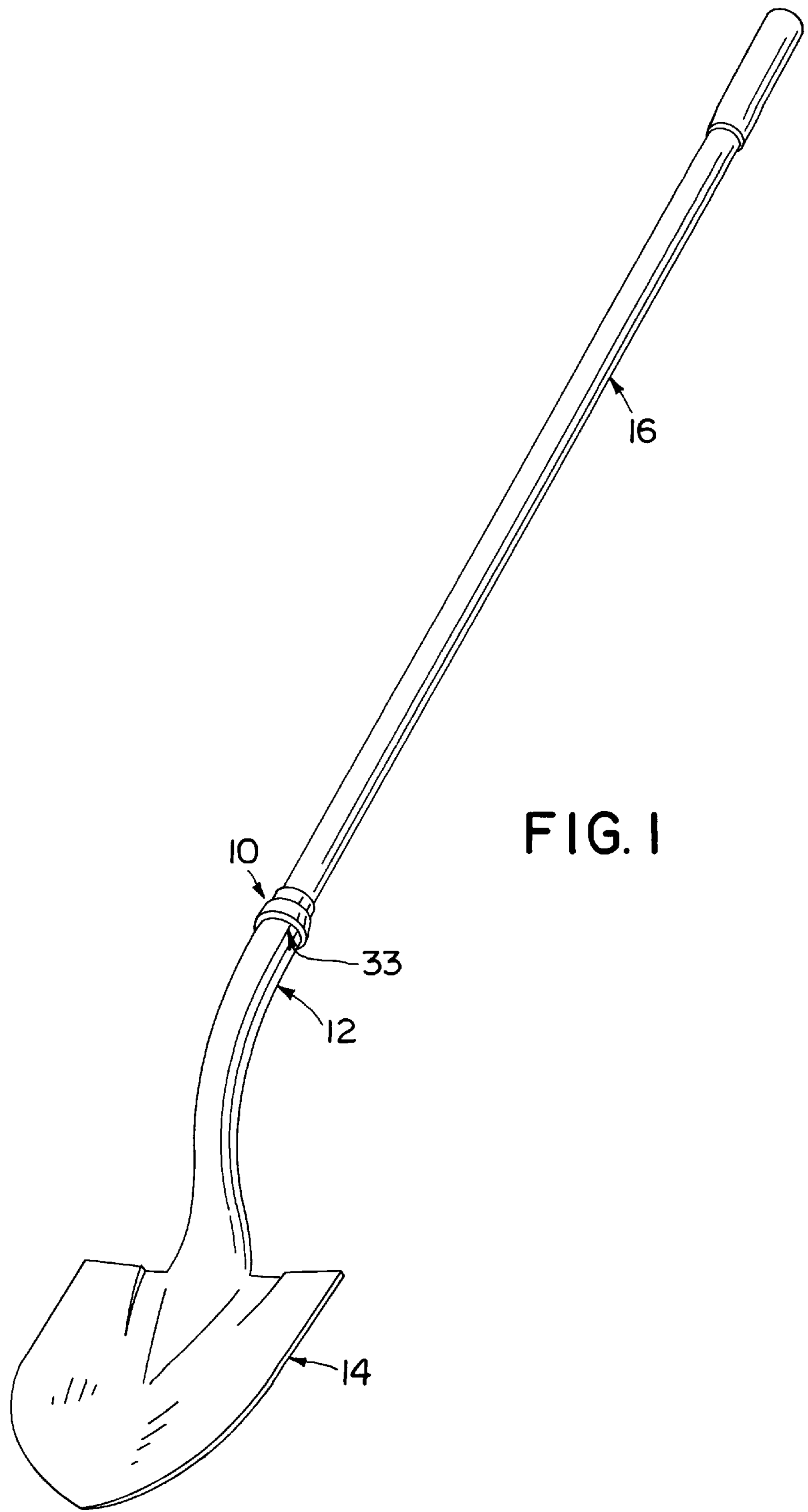
FIG. 1 is a perspective view of a shovel incorporating the transition piece of the present invention.

Referring to FIG. 1, transition piece 10 of the invention is adapted to be used as an interface between socket 12 of a tool head 14, depicted here as the head of a long handled round-blade shovel or spade, and a tool handle 16 which is sized to pass within the socket 12. The invention is also applicable to tools other than spades, i.e., having other types of tool head and/or different handle configurations.

Figure 2:
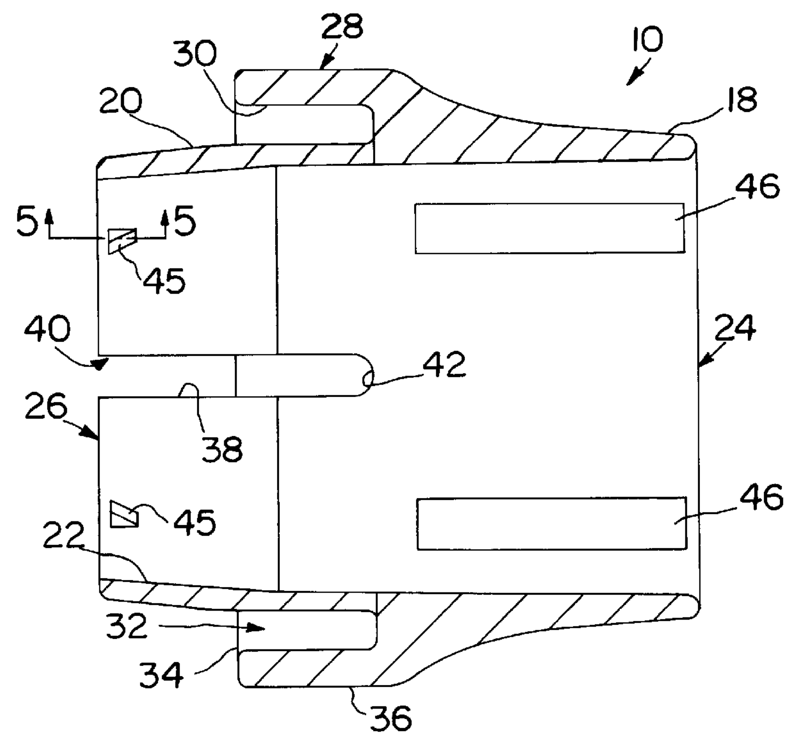
FIG. 2 is a sectional side elevational view of the transition piece.
Figure 3:
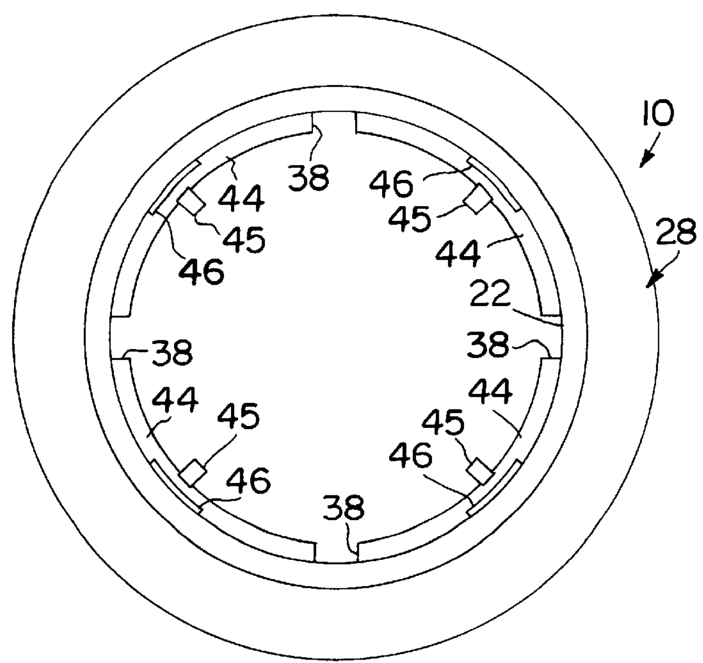
FIG. 3 is an end view from an upper end of the transition piece.
Figure 4:
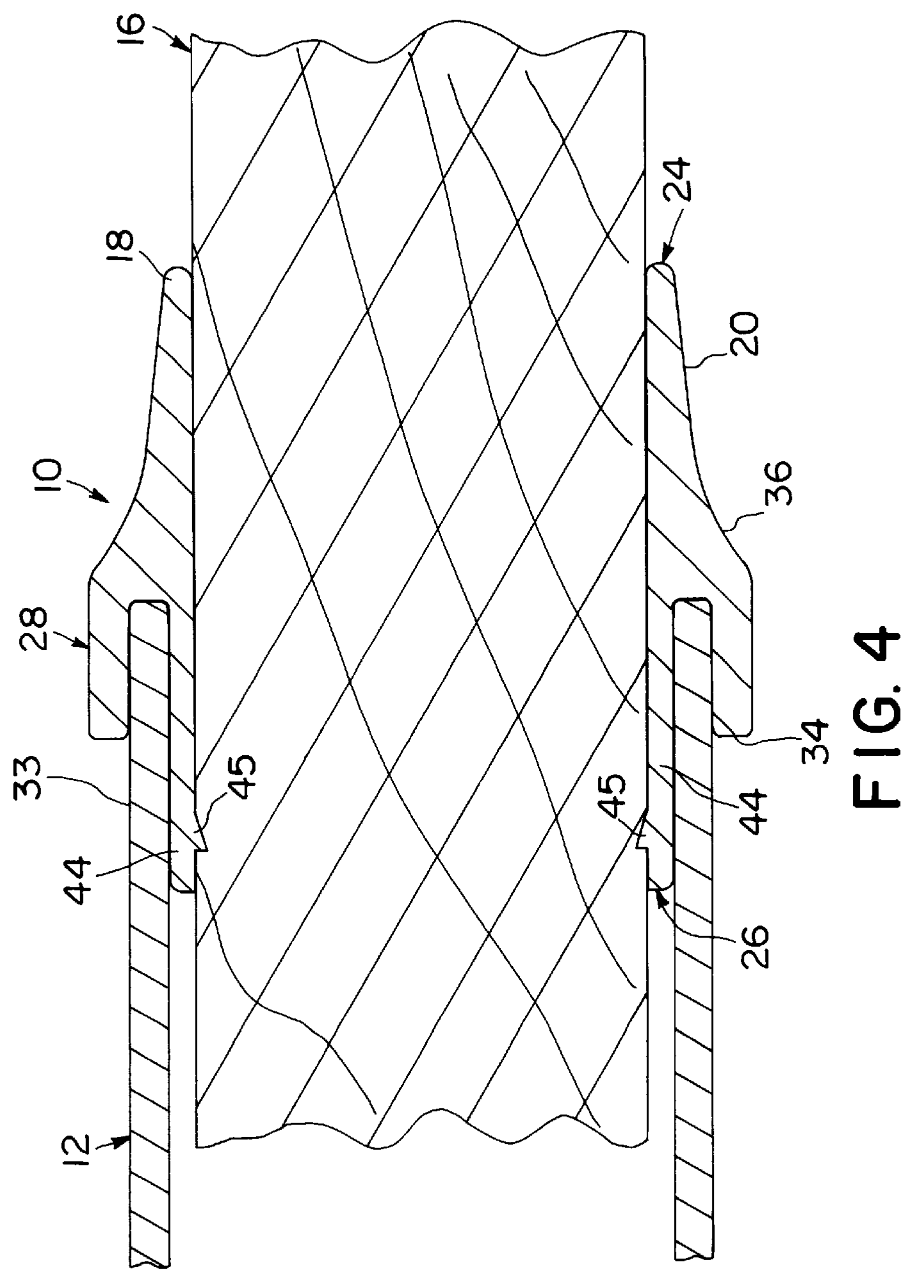
FIG. 4 is a sectional side elevational view of the transition piece in use as an interface between a tool end socket and a tool handle; and, FIG. 5 is a fragmentary sectional view of the lower end of the cylindrical body, as taken along line 5—5 in FIG. 2, showing a locking ramp.

As seen in FIGS. 2 and 3, the transition piece 10 comprises a hollow, substantially cylindrical body 18 including an outer wall surface 20, an inner wall surface 22, an upper end 24, and a lower end 26. More particularly, upper end 24 is sized so as to receive, within its interior, an end of tool handle 16 so that tool handle 16 may be inserted through transition piece 10. An annular skirt 28 is disposed radially outwardly from outer wall surface 20. Annular skirt 28 comprises an inner annular surface 30, an annular end 34, and an outer surface 36. As best seen in FIG. 2, inner annular surface 30 is disposed in confronting relation to outer wall surface 20, so as to define an annular recess 32 therebetween. Annular recess 32 is sized so as to accept end portion 33 of tool head socket 12 (FIG. 4). An annular end 34 defines the lower edge of annular skirt 28. Outer surface 36 tapers radially inwardly to outer wall surface 20 of cylindrical body 18 in a direction toward upper end 24.

Figure 5:
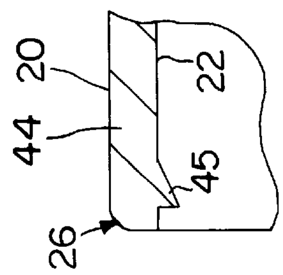

Lower end 26 comprises a generally frusto-conical shape that tapers radially inwardly. A plurality of slots 38, and preferably a pair of diametrically opposed slots, are formed in cylindrical body 18 and extend longitudinally from an open slot end 40, adjacent to lower end 26, to a closed terminal end 42 that is located intermediate upper and lower ends 24, 26. Slots 38 segment lower end 26 into a plurality of inwardly tapered walls 44 (best seen in FIG. 3). As a result of this construction, tapered walls 44 are adapted to flex in a radial direction. A plurality of locking ramps 45 are disposed in spaced, circumferential-relation about the inner surface of tapered walls 44 (FIGS. 2–5). Locking ramps 45 project radially inwardly relative to inner wall surface 22. Thus, as a tool handle 16 is inserted through upper end 24 of cylindrical body 18, it will engage tapered walls 44 via locking ramps 45. As this occurs, tapered walls 44 are biased outwardly, toward annular skirt 28 (FIG. 5). In this way, a positive frictional engagement of outer wall surface 20 with end portion 33 of tool head socket 12 is provided, when end portion 33 is located within annular recess 32. Still referring to FIG. 5, once outer wall surface 20 is fully engaged with the inner surface of end portion 33, locking ramps 45 positively engage tool handle 16 so as to resist longitudinal and rotational movement of tool handle 16 relative to socket 12.

Referring again to FIGS. 2 and 3, a plurality of ribs 46 project radially inwardly in circumferentially-spaced relation to each other from inner wall surface 22. Ribs 46 extend in a longitudinal direction, from a position intermediate of upper end 24 and lower end 26, toward upper end 24 of cylindrical body 18. Ribs 46 define discrete engagement surfaces for engaging tool handle 16 so as to ensure that the upper portion of cylindrical body 18 positively engages tool handle 16 around its entire circumference. Thus, ribs 46 help to prevent radial movements of the upper portion of cylindrical body 18 relative to the handle.

As seen in FIG. 4, transition piece 10 acts as a spacer between tool handle 16 and socket 12 of tool head 14. Transition piece 10 is preferably formed as a one-piece cast metal part, and acts to absorb shear forces which are typically produced at the connection between end portion 33 of socket 12 and tool handle 16. Advantageously, this arrangement substantially eliminates wearing of socket 12 and tool handle 16 which typically occurs at the interface therebetween. Further, transition piece 10 acts to capture both socket 12 and tool handle 16 in engagement with each other in that insertion of the tool handle 16 through transition piece 10 acts on tapered walls 44, via locking ramps 45, so as to bias them outwardly into engagement with socket 12, and further provides for positive frictional engagement with tool handle 16. In this manner, socket 12 and tool handle 16 are locked in a desired longitudinal relationship to each other.

Transition piece 10 of the present invention further provides a smooth visual transition between tool handle 16 and socket 12, and also facilitates assembly of the tool inasmuch as no additional fasteners are necessary for maintaining tool handle 16 in position relative socket 12. In particular, transition piece 10 does not require fasteners of any kind to maintain its position on the tool due to the plurality of locking ramps 45.

While the form of apparatus herein described constitutes a preferred embodiment of this invention, it is to be understood that the invention is not limited to this precise form of apparatus, and that changes may be made therein without departing from the scope of the invention which is defined in the appended claims.

What is claimed is:

1. A transition piece for use on tools of the type having a tool head adapted with a socket for receiving a tool handle, said transition piece comprising:

a hollow cylindrical body having an outer wall surface and an inner wall surface, and defining an upper end and a lower end wherein said lower end tapers radically inwardly;

an annular skirt positioned radially outwardly from said outer wall surface and including an inner surface disposed in confronting relation to said outer wall surface of said cylindrical body so as to define an annular recess for receiving said tool head socket;

a plurality of slots formed in said cylindrical body extending longitudinally from said lower end toward said upper end, each said slot including a terminal end located intermediate said lower end and said upper end, said slots segmenting said lower end into at least two tapered walls;

a plurality of ribs circumferentially spaced from each other on said inner wall surface and extending longitudinally from said tapered walls toward said upper end;

wherein said transition piece is configured to form a spacer between said tool handle passing through said cylindrical body and said tool head socket positioned in said annular recess, wherein engagement of said tool handle with said tapered walls operates to bias said tapered walls outwardly toward engagement with said tool head socket positioned in said annular recess.

2. The transition piece of claim 1 wherein said tapered walls are located between said lower end and said terminal ends of said slots.

3. The transition piece of claim 1 wherein said annular skirt includes an annular end located at an axial position aligned with an axial position of said tapered walls.

4. The transition piece of claim 1 wherein said annular skirt includes an outer surface which tapers inwardly to said outer wall surface in a direction toward said upper end to thereby form a smooth outer surface for said transition piece.

5. A transition piece for use on tools of the type having a tool head adapted with a socket for receiving a tool handle, said transition piece comprising:

a hollow cylindrical body having an outer wall surface and an inner wall surface, and defining an upper end and a lower end;

an annular skirt positioned radially outwardly from said outer wall surface and including an inner surface disposed in confronting relation to said outer wall surface so as to define an annular recess for receiving a portion of said tool head socket, and said annular skirt including an outer surface which tapers inwardly to said outer wall in a direction toward said upper end;

a pair of diametrically opposed slots formed in said body extending longitudinally from said lower end toward said upper end, each said slot including a terminal end located intermediate said lower end and said upper end;

a plurality of tapered walls protruding radially inwardly between said lower end and said terminal ends of said slots;

a plurality of ribs located on said inner wall surface and extending longitudinally from said plurality of tapered walls toward said upper end; and wherein said transition piece is configured to form a spacer between said tool handle passing through said cylindrical body and said tool head socket positioned in said annular recess, wherein engagement of said tool handle with said tapered walls operates to bias said tapered walls outwardly toward engagement with said tool head socket positioned in said annular recess.

* * * * *